(12) United States Patent
Chao et al.

(10) Patent No.: US 11,126,247 B2
(45) Date of Patent: Sep. 21, 2021

(54) POWER MODE MANAGEMENT SYSTEM, METHOD FOR PROVIDING POWER MODE PARAMETER COMBINATION, METHOD FOR UPDATING POWER MODE PARAMETER COMBINATION, COMPUTER SOFTWARE AND STORAGE MEDIUM

(71) Applicant: GIGA-BYTE TECHNOLOGY CO., LTD., New Taipei (TW)

(72) Inventors: Ching-Hung Chao, New Taipei (TW); Hou-Yuan Lin, New Taipei (TW); Mou-Ming Ma, New Taipei (TW); Chun-Kun Lan, New Taipei (TW); Po-Chang Tseng, New Taipei (TW); Hung-Yen Chen, New Taipei (TW); Chun-Yu Wang, New Taipei (TW); Yih-Neng Lin, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 68 days.

(21) Appl. No.: 16/561,000

(22) Filed: Sep. 4, 2019

(65) Prior Publication Data
US 2020/0209939 A1 Jul. 2, 2020

(30) Foreign Application Priority Data
Dec. 27, 2018 (TW) ................ 107147536

(51) Int. Cl.
*G06F 1/32* (2019.01)
*G06F 1/20* (2006.01)
(Continued)

(52) U.S. Cl.
CPC .............. *G06F 1/325* (2013.01); *G06F 1/206* (2013.01); *G06F 1/3287* (2013.01); *H04W 52/02* (2013.01)

(58) Field of Classification Search
CPC ............................. G06F 1/206; H04W 52/02
See application file for complete search history.

(56) References Cited

U.S. PATENT DOCUMENTS 8,909,950 B1 12/2014 Levchuk et al.
9,489,027 B1 * 11/2016 Ogletree .................. G06F 1/28
(Continued)

OTHER PUBLICATIONS

Jayaseelan, R., "Application-specific thermal management of computer systems", Doctoral dissertation, National University of Singapore, 2009.
(Continued)

*Primary Examiner* — Jaweed A Abbaszadeh
*Assistant Examiner* — Cheri L Harrington
(74) *Attorney, Agent, or Firm* — Idea Intellectual Limited; Margaret A. Burke; Sam T. Yip (57) ABSTRACT

A method for updating a power mode parameter combination, includes identifying a current hardware combination of a client host; loading and executing a current application program; loading a default profile according to the current application program to update a current power mode parameter combination of the current hardware combination; receiving a user-defined parameter combination to update the current power mode parameter combination of the current hardware combination; correlating the current application program, the current hardware combination and the updated current power mode parameter combination to generate a current profile as an updated default profile; and transmitting the current profile to a server as a candidate profile.

10 Claims, 8 Drawing Sheets

(51) Int. Cl.
*H04W 52/02* (2009.01)
*G06F 1/3234* (2019.01)
*G06F 1/3287* (2019.01)

(56) References Cited

U.S. PATENT DOCUMENTS

| | | |
|---|---|---|
| 9,496,736 B1 | 11/2016 | Johansson et al. |
| 10,732,690 B2 * | 8/2020 | Hauser ................. G06F 1/3206 |
| 2009/0049312 A1 | 2/2009 | Min |
| 2010/0293404 A1 * | 11/2010 | Diab ..................... G06F 1/3209 |
| | | 713/324 |
| 2010/0313050 A1 * | 12/2010 | Harrat ................... G06F 1/3293 |
| | | 713/323 |
| 2012/0110360 A1 | 5/2012 | Lin et al. |
| 2015/0039649 A1 * | 2/2015 | Andrews ............. G06F 16/9535 |
| | | 707/770 |
| 2016/0085566 A1 * | 3/2016 | Benzaia .............. G06F 11/3409 |
| | | 713/100 |
| 2017/0371394 A1 * | 12/2017 | Chan ..................... G06F 1/3218 |
| 2020/0026339 A1 * | 1/2020 | Sebastian .............. H04L 67/145 |
| 2020/0209939 A1 * | 7/2020 | Chao ....................... G06F 1/206 |

OTHER PUBLICATIONS

Office action of corresponding Australian Patent Application No. 2019272063 dated Jul. 7, 2020.
Office action of corresponding New Zealand Patent Application No. 759649 dated Jul. 17, 2020.
Search Report issued in corresponding European patent application No. 19196159.8 dated Mar. 11, 2020.

* cited by examiner

POWER MODE MANAGEMENT SYSTEM, METHOD FOR PROVIDING POWER MODE PARAMETER COMBINATION, METHOD FOR UPDATING POWER MODE PARAMETER COMBINATION, COMPUTER SOFTWARE AND STORAGE MEDIUM

CROSS-REFERENCE TO RELATED APPLICATION

This non-provisional application claims priority under 35 U.S.C. § 119(a) to Patent Application No. 107147536 filed in Taiwan, R.O.C. on Dec. 27, 2018, the entire contents of which are hereby incorporated by reference.

BACKGROUND

Technical Field

This disclosure relates to power mode switching of a computer host, in particular to a power mode management system, a method for providing a power mode parameter combination, a method for updating a power mode parameter combination, a computer software and a storage medium.

Related Art

In order to consider the power mode demand and energy saving at the same time, a computer operating system usually provides a power mode management function, which allows users to select and load one of different power mode profiles according to the needs. The power mode profile is used to make the operating system cooperate with other system management components to set the power mode of each hardware component, such that the power mode of the hardware component can be adjusted according to an executed program, and the program can be executed smoothly without consuming too much electricity due to too high power mode setting.

The power mode profile mentioned above is not optimized aiming at specific program. Simply several fixed options are provided from high power mode to low power mode. Therefore, the user may need to select the closest power mode profile for the executed program, and then manually fine-tune the parameters as a user-defined profile.

SUMMARY

Various parameters may be manually fine-tuned or user-defined profiles may be enabled to cooperate with the executed program to satisfy the demand of considering both the power mode and energy consumption at the same time. However, manual fine-tuning of various parameters requires time-consuming repeated testing. At the same time, once the executed program is different, the foresaid user-defined profile is not applicable, such that the user must configure the user-defined profile for the new program, and manually enable different user-defined profiles when executing different programs.

In view of the above problems, this disclosure provides a power mode management system, including a server and a client host. The server is connected to a network and stores at least one available profile; the available profile is correlated with a target application program and a target hardware combination, and stores a target parameter combination of the target hardware combination; wherein the server receives a plurality of candidate profiles through the network and selects one of the candidate profiles as another available profile. The client host is connected to the network, and the client host includes a current hardware combination.

The client host loads and executes a current application program and loads a power mode setting program segment to execute the following steps: when the current application program complies with the target application program and the current hardware combination complies with the target hardware combination, the client host loads the available profile from the server through the network, and updates a current power mode parameter combination of the current hardware combination according to the target parameter combination; and when the current application program and the current hardware combination do not respectively comply with the target application program and the target hardware combination, the client host correlates the current application program, the current hardware combination and the current power mode parameter combination to generate a current profile, and transmits the current profile to the server as one of the candidate profiles.

In at least one embodiment of this disclosure, the target hardware combination may at least include a target central processing unit and a target graphics processing unit.

The current hardware combination may at least include a central processing unit and a graphics processing unit.

The target hardware combination may further include a heat dissipating device, an audio device or a keyboard.

The current hardware combination may further include a heat dissipating device, an audio device or a keyboard.

In at least one embodiment of this disclosure, after the client host executes the current application program, the client host generates an available profile request and transmits the available profile request to the server, and the available profile request contains the current application program and the current hardware combination.

When the current application program complies with the target application program and the current hardware combination complies with the target hardware combination, the server uses the corresponding available profile as a response to the available profile request.

In at least one embodiment of this disclosure, the client host executes a plurality of application programs and uses the application program executed at a foreground as the current application program.

This disclosure further provides a method for providing a power mode parameter combination, including: receiving a plurality of candidate profiles, wherein each candidate profile is correlated with a candidate application program and a candidate hardware combination, and stores a candidate parameter combination of the candidate hardware combination; classifying the candidate profiles into a plurality of groups according to the candidate application program and the candidate hardware combination; in the candidate profiles of each group, selecting one of the candidate profiles as an available profile, and using the corresponding candidate application program, the candidate hardware combination and the candidate parameter combination respectively as a target application program, a target hardware combination and a target parameter combination of the available profile; receiving an available profile request, wherein the available profile request is correlated with a current application program and a current hardware combination; and when the current application program and the current hardware combination respectively comply with the target application program and the target hardware combination, using the available profile to respond to the available profile request.

In at least one embodiment of this disclosure, the step of selecting one of the candidate profiles as the available profile includes: classifying the candidate profiles into a plurality of groups, the candidate profiles of each group including the same candidate application program and candidate hardware combination; and in each group, selecting one of the candidate profiles as the available profile according to a receiving frequency of each candidate parameter combination.

In at least one embodiment of this disclosure, the step of selecting one of the candidate profiles as the available profile further includes: in each group, selecting the candidate parameter combination with the highest receiving frequency, and using the corresponding candidate profile as the available profile.

In at least one embodiment of this disclosure, if there is no compliant available profile according to comparison, responding a request fail message.

This disclosure provides a method for updating a power mode parameter combination, executed on a client host, wherein the client host establishes a communication connection with a server; and the method includes: identifying a current hardware combination of the client host; loading and executing a current application program; loading a default profile according to the current application program to update a current power mode parameter combination of the current hardware combination; receiving a user-defined parameter combination to update the current power mode parameter combination of the current hardware combination; correlating the current application program, the current hardware combination and the updated current power mode parameter combination to generate a current profile as an updated default profile; and transmitting the current profile to the server as a candidate profile.

In at least one embodiment of this disclosure, the step of loading the default profile includes: generating an available profile request and transmitting the available profile request to the server, wherein the available profile request contains the current application program and the current hardware combination; receiving a response from the server; and when the response is an available profile, using the available profile to update the default profile, wherein the available profile contains a target application program, a target hardware combination and a target parameter combination, the current application program and the current hardware combination respectively comply with the target application program and the target hardware combination, and the target parameter combination is used for updating the current power mode parameter combination of the current hardware combination.

In at least one embodiment of this disclosure, the client host executes a plurality of application programs and uses the application program executed at a foreground as the current application program.

In at least one embodiment of this disclosure, this disclosure provides a computer software for a client host to load and execute the method for updating a power mode parameter combination.

In at least one embodiment of this disclosure, this disclosure provides a storage medium for a client host to read and execute the method for updating a power mode parameter combination.

Through the cooperation between the server and the client host, the client host may request the corresponding available profile from the server at any time according to the different current application program. Therefore, in the client host, the power mode profile is not limited to the specific application program. The server may also add or update the available profile through the uploading by the client host, so as to avoid the problem that a database cannot provide the available profile since no relevant profiles are established.

BRIEF DESCRIPTION OF THE DRAWINGS

This disclosure will become more fully understood from the detailed description given herein below for illustration only, and thus not limitative of this disclosure, wherein.

DETAILED DESCRIPTION

Figure 1:
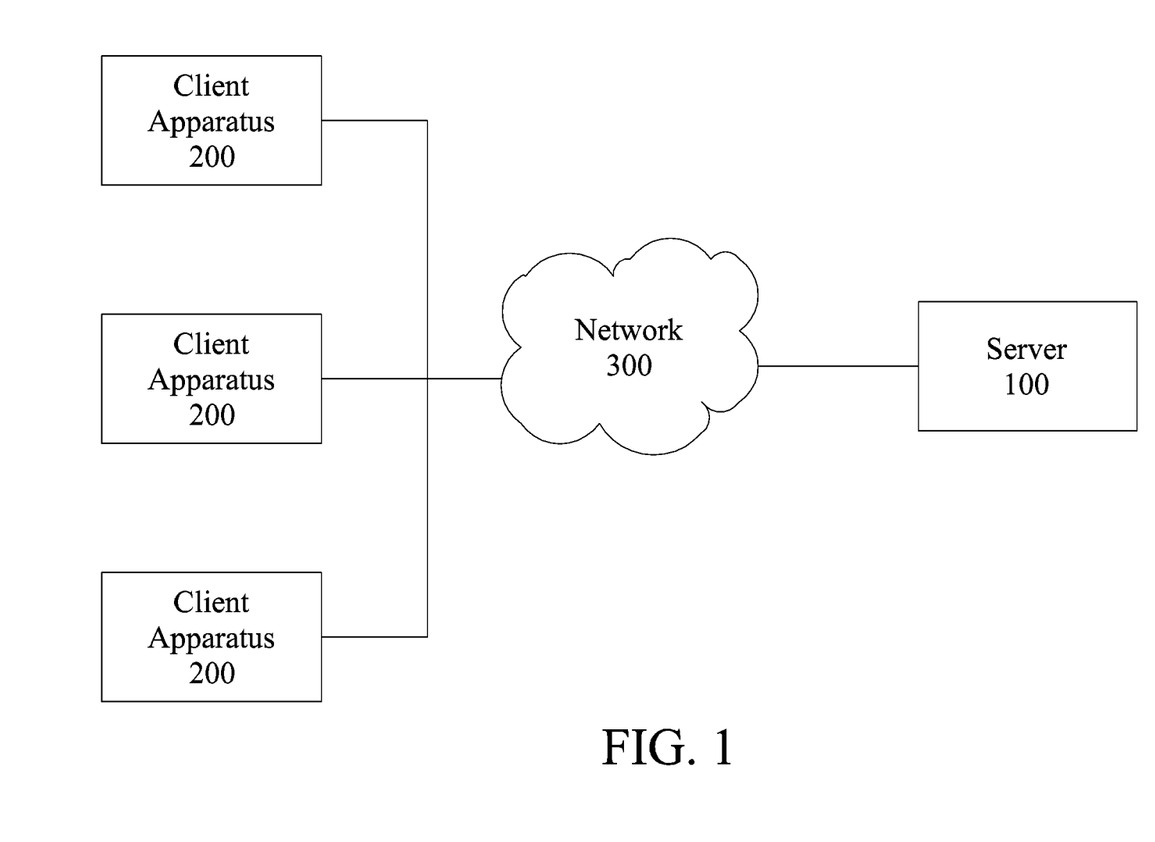
FIG. 1 is a schematic block diagram of a power mode management system in one embodiment of this disclosure.
Figure 2:
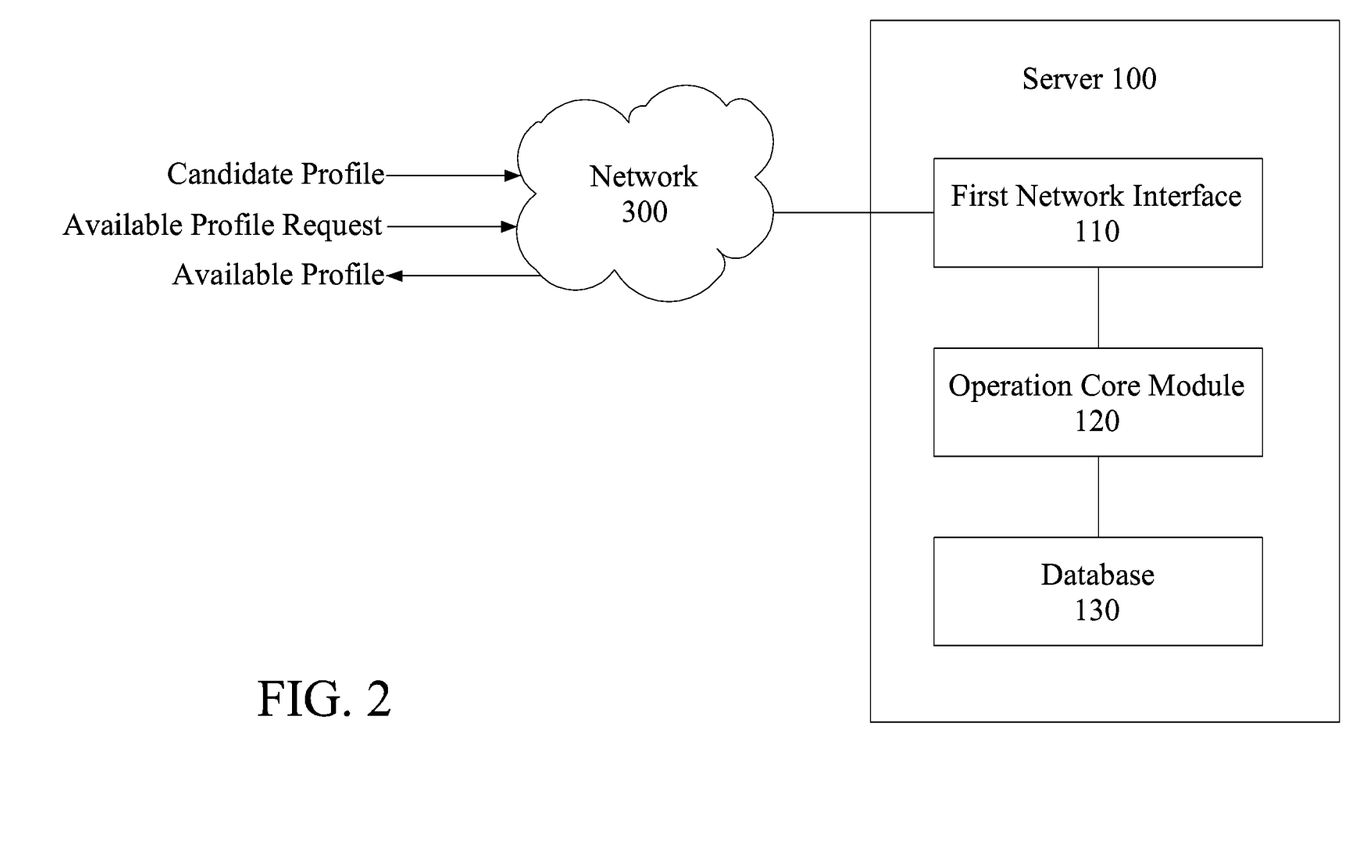
FIG. 2 is a schematic block diagram of a server in one embodiment of this disclosure.
Figure 3:
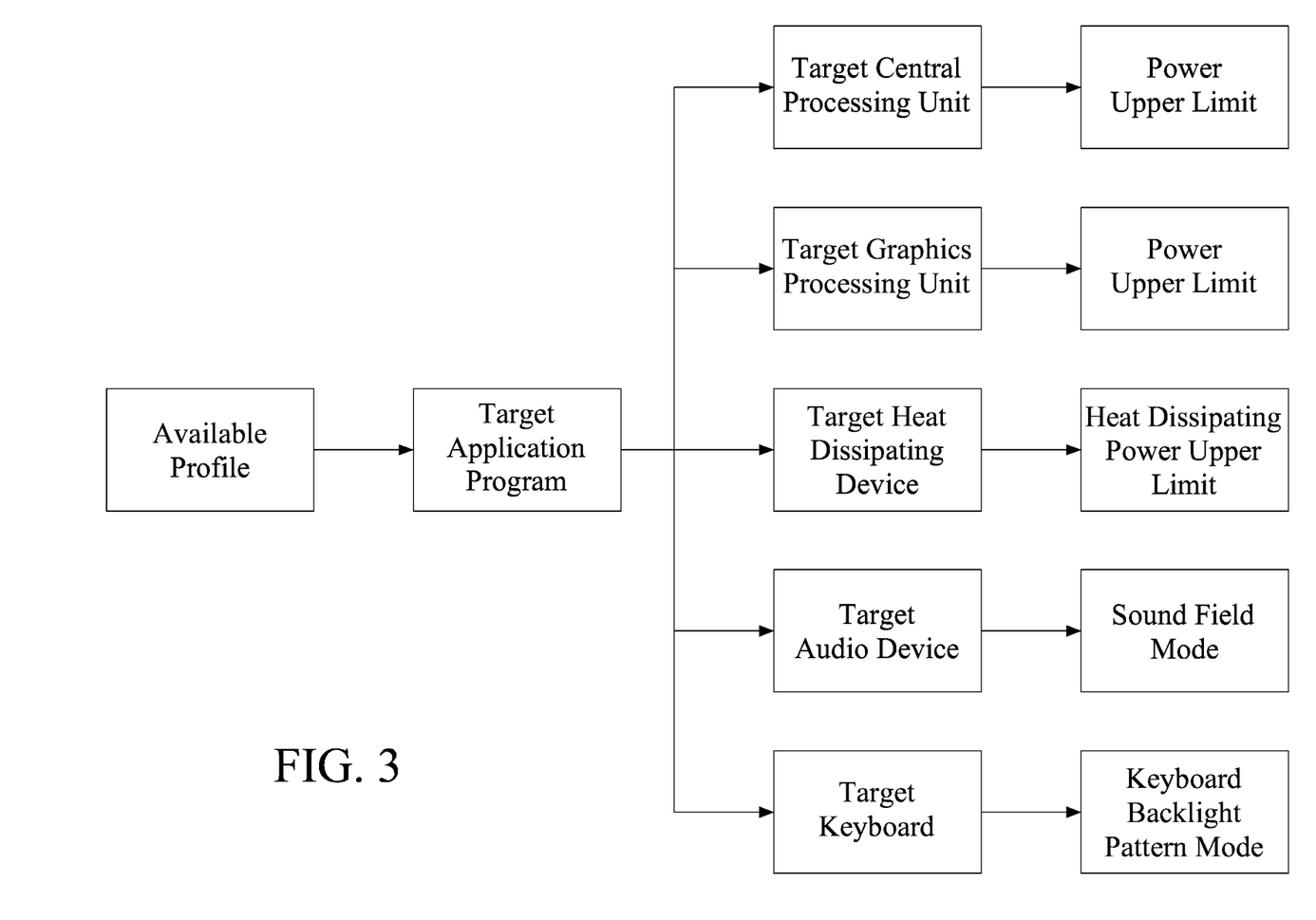
FIG. 3 is a schematic diagram of association of an available profile in one embodiment of this disclosure.

Referring to FIG. 1, FIG. 2 and FIG. 3, a power mode management system disclosed by an embodiment of this disclosure includes a server 100 and client apparatuses 200 which establish a communication connection through a network 300. The number of the client apparatuses 200 is more than one and the client apparatuses are located at different places. These client apparatuses 200 may upload user-defined profiles corresponding to their current application program sets and current hardware combinations to the server 100 as candidate profiles. The server 100 may classify these candidate profiles and select one of them as an available profile for the client apparatuses 200 to download as an available profile for the corresponding current application program.

The hardware combination described below at least includes a combination of a central processing unit and a graphics processing unit, and in particular may further include a distinction of detailed models. In one or more embodiments, the hardware combination may also include a heat dissipating device, an audio device or a keyboard, as well as a distinction of detailed models. The parameter combination described below includes parameter settings for operation of the above-mentioned central processing unit, graphics processing unit, heat dissipating device, audio device and/or keyboard, and these parameters may be detailed values, such as an operating frequency and a power upper limit of the central processing unit or graphics processing unit, or mode numbers, such as the sound field mode number of the audio device, or the backlight pattern mode number of the keyboard.

As shown in FIG. 1 and FIG. 2, the server 100 is connected to the network 300. The server 100 includes a first network interface 110, an operation core module 120 and a database 130. The operation core module 120 has at least one central processing unit and a storage module. The storage module is a combination of a volatile memory and a non-volatile memory, is used as a storage space for an operating system, service programs and data, and is used as a temporary storage space for program segment execution.

The steps described below are steps performed by the server 100 and the client host 200 after loading a necessary program segment. However, the execution of these steps does not exclude other hardware or modules consisting of hardware and software. The module may be a combination of processing specific functions or steps after a specific integrated circuit, an electronic circuit, a microprocessor, a single processor or a processor group combined with memory to execution program segments and specific algorithms.

As shown in FIG. 1 and FIG. 2, the first network interface 110 is connected to the network 300 for the client host 200 to establish a communication connection based according a service address. The database 130 may be a single hard disk, an array of hard disks or a data center consisting of a mainframe computer. Or, the operation core module 120 and the database 130 may be a virtual machine, which is mounted on the mainframe computer and connected to the network 300 through the network 300 interface of the mainframe computer as the first network interface 110.

As shown in FIG. 1, FIG. 2 and FIG. 3, the database 130 stores a plurality of available profiles. The available profiles are correlated with a target application program and a target hardware combination, and store a target parameter combination of the target hardware combination.

The target hardware combination may at least include a target central processing unit and a target graphics processing unit, and the target parameter combination may include operation parameter settings of the target central processing unit and the target graphics processing unit. Specifically, the available profiles may be text files or in other file formats, which record the detailed models of the target central processing unit and the target graphics processing unit as a record format of the target hardware combination, and simultaneously record the name and version number of the target application program as a record format of the target application program.

In addition to the product series, the above-mentioned detailed models further include identification information of functional details such as running speed, buffer memory size and a supported instruction set. Generally speaking, such detailed models will be provided by manufacturers, and may allow the operating system to be read by the central processing unit 210 and the graphics processing unit 220 of the client host 200 through a hardware management program or a hardware driver program. In addition, the target hardware combination may further include other hardware, such as the target heat dissipating device, the target audio device and/or the target keyboard, and the target parameter combination includes operation parameter settings such as a heat dissipating power upper limit, sound field mode setting and keyboard backlight pattern mode setting (to make specific keys eye-catching by emitting light).

As shown in FIG. 2, through the first network interface 110, the server 100 receives a plurality of candidate profiles from the network 300. These candidate profiles may come from a single client host 200, but are correlated with different candidate application programs; they may also come from different client hosts 200 and are all correlated with the same candidate application program.

The candidate profile is correlated with a candidate application program and a candidate hardware combination, and stores a candidate parameter combination. The target hardware combination may at least include a target central processing unit and a target graphics processing unit, and the target parameter combination may include operation parameter settings of the target central processing unit and the target graphics processing unit. The candidate hardware combinations may further include other hardware, such as the target heat dissipating device, the audio device, and/or the keyboard. The candidate parameter combination may include the operation parameter setting of the hardware mentioned above. The candidate profiles may also be text files or in other file formats and the record format is the same as that of the target profile. In fact, the content recorded by the candidate profile is the same as that recorded by the available profile, and the difference is that the information recorded by the candidate profile is the actual state of the client host 200, and especially the candidate parameter combination is usually a user-defined parameter combination set by the user.

The server 100 will select one of these candidate profiles as another available profile in the following steps. According to the correlated candidate application program and candidate hardware combination, the server 100 classifies these candidate profiles into a plurality of groups. Each group of these candidate profiles has the same candidate application program and candidate hardware combination. The server 100 finds out the most appropriate candidate parameter combination in candidate profiles of each group to select the corresponding candidate profile as an available profile. The most appropriate candidate parameter combination refers to the candidate parameter combination which may make the candidate application program to be executed normally and the energy consumption of the client host 200 not to be too high based on the specific candidate application program and candidate hardware combination. This most appropriate candidate parameter combination is not necessarily determined directly by the server 100, but may be analyzed by the reception of the candidate parameter combination.

Therefore, in the selection above, the receiving frequency of each candidate parameter combination is related to whether the corresponding candidate profile is selected. By using a statistical mechanism alone, the server 100 finds out the candidate parameter combination with the highest receiving frequency (most frequently uploaded) in candidate profiles of each group, and the corresponding candidate profile is used as the available profile. The server 100 may also further analyze the receiving frequency through a convolutional neural network (CNN) 300 or other learning algorithms to find out the candidate parameter combination to be most likely accepted by users, and the corresponding candidate profile is used as the available profile.

Figure 4:
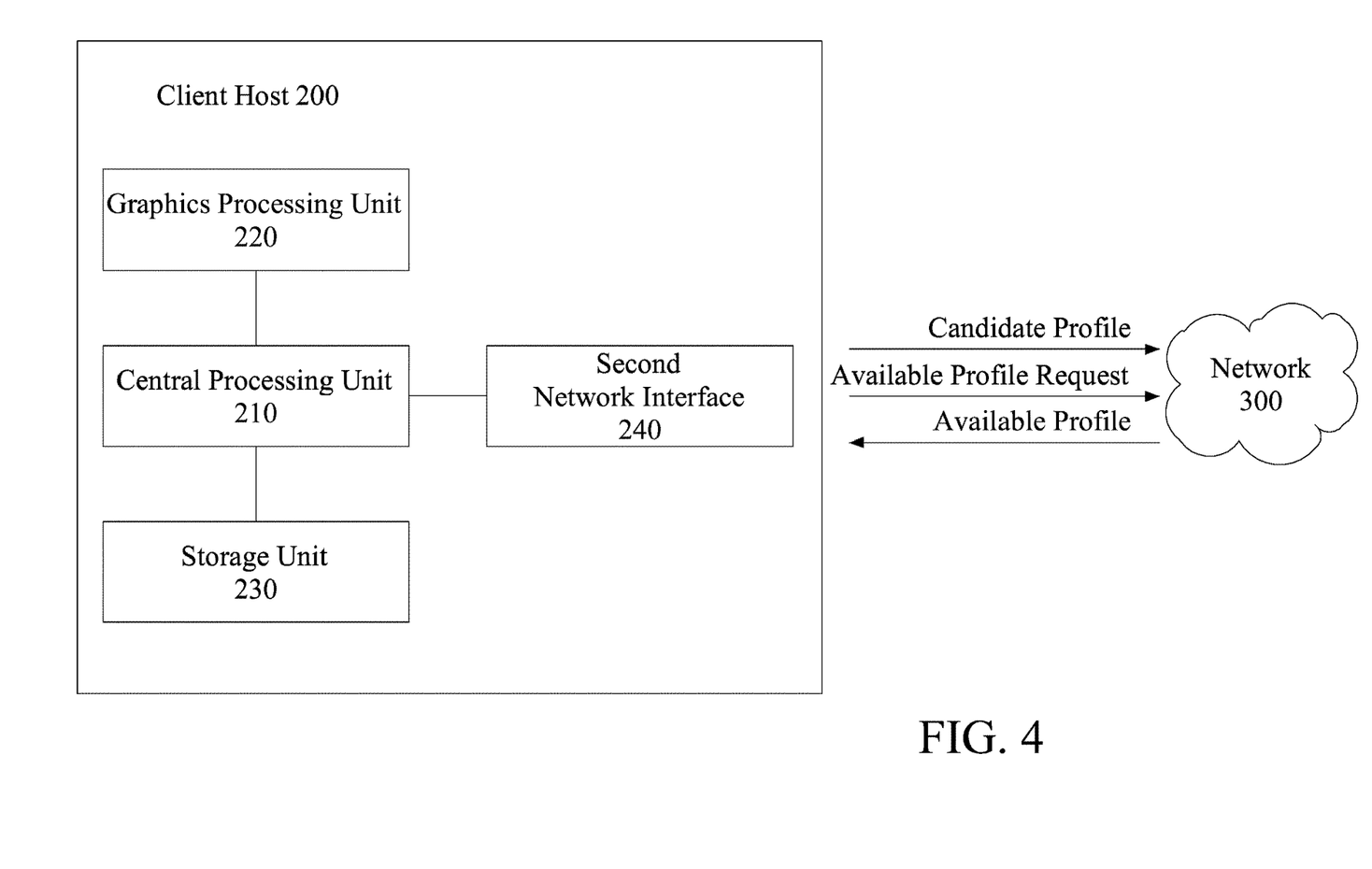
FIG. 4 is a schematic block diagram of a client host in one embodiment of this disclosure.

As shown in FIG. 1 and FIG. 4, the client host 200 at least includes a central processing unit 210, a graphics processing unit 220, a storage unit 230 and a second network interface 240. The central processing unit 210, the graphics processing unit 220 and other hardware that may change operation parameter settings may be used as a hardware combination of the client host. The client host 200 is used for loading and executing a current application program and loading a power mode setting program segment to execute steps for updating power mode parameters.

As shown in FIG. 4, the graphics processing unit 220, the storage unit 230 and the second network interface 240 are electrically connected to the central processing unit 210.

The central processing unit 210 loads and executes the current application program from the storage unit 230, loads the power mode setting program segment to execute the corresponding step combination, is connected to the network 300 through the second network interface 240, and establishes a communication connection with the server 100.

Figure 6:
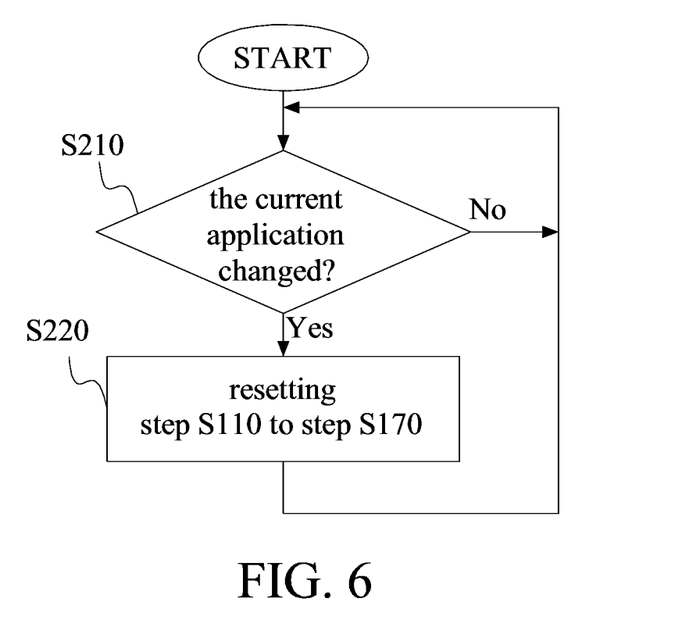
FIG. 6 is a detailed flowchart of a partial flow in FIG. 5.

As shown in FIG. 6, the central processing unit 210 loads the power mode setting program segment from the storage unit 230 to execute a method for updating a power mode parameter combination. The storage unit 230 mentioned above not only refers to an individual non-volatile memory or volatile memory, but also refers to the combination of a non-volatile memory and a volatile memory required for data storage and program segment running. In one specific embodiment, the power mode setting program segment is stored as a computer software in a storage medium for the client host 200 to load to execute the method for updating the power mode parameter combination.

Figure 5:
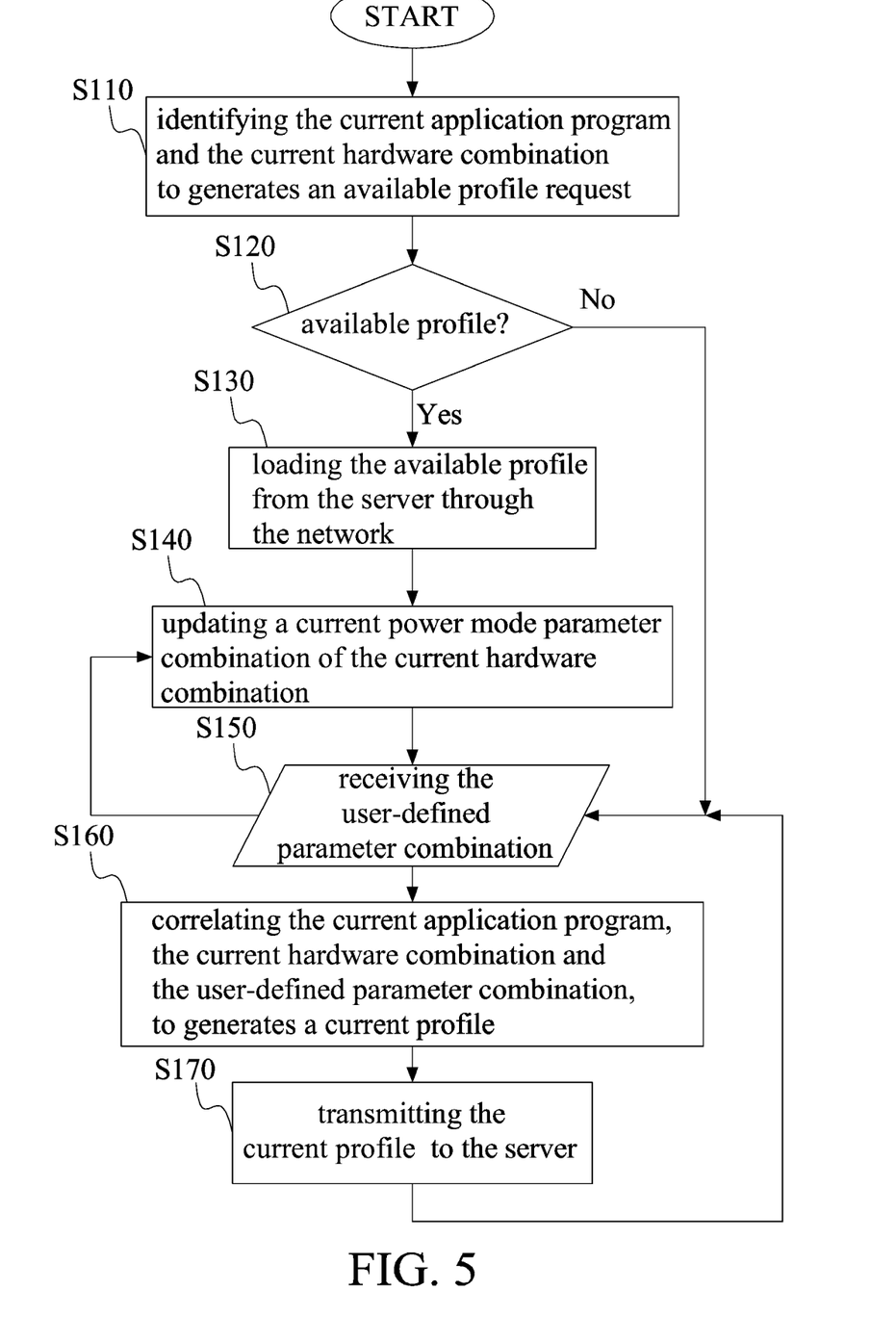
FIG. 5 is a flowchart of a method for updating a power mode parameter combination in one embodiment of this disclosure.

As shown in FIG. 5, after any application program (such as a game program, a browser, a media player, a document editing program, a drawing program, etc.) of the client host 200 is started, is executed at a foreground and becomes a current application program, the client host 200 identifies the current application program and the current hardware combination, generates an available profile request and transmits the available profile request to the server 100 through the network 300 to request the corresponding available profile, as shown in step S110. The available profile request contains the current application program and the current hardware combination.

In response to the server 100, the client host 200 determines whether there is an available profile that complies with the current application program and the current hardware combination, as shown in step S120.

If there is an available profile, that is, the current application program complies with the target application program of the available profile and the current hardware combination complies with the target hardware combination of the available profile, the server 100 uses the corresponding available profile as a response to the available profile request, and the client host 200 loads the available profile from the server 100 through the network 300, as shown in step S130.

The client host 200 then updates a current power mode parameter combination of the current hardware combination according to the available profile, e.g., adjusts the operation parameter settings of the central processing unit 210 and the graphics processing unit 220 to change the overall power mode of the client host 200, so as to satisfy the demand of the current application program, as shown in step S140.

When the server 100 responds that there is no available profile, that is, the current application program and the current hardware combination do not respectively comply with the target application program and the target hardware combination of any available profile, the client host 200 waits for the user to input the user-defined parameter combination.

After receiving the user-defined parameter combination, the client host 200 updates the current power mode parameter combination of the current hardware combination according to the user-defined parameter combination, so as to change the power mode parameter setting of the client host 200, as shown in step S150 and step S140.

Next, the client host 200 correlates the current application program, the current hardware combination and the user-defined parameter combination, generates a current profile to be stored as an updated default profile, and transmits the current profile to the server 100 as one of these candidate profiles, as shown in step S160 and step S170.

In the continuous execution of the application program, the steps executed by the client host 200 may be returned to step S150 at any time, to wait for receiving the user-defined parameter combination.

As shown in FIG. 6, considering that the client host 200 executes a plurality of application programs, such that different application programs are switched to a foreground for execution and become the current application program, the client host 200 simultaneously executes an interrupt trigger program to monitor whether the current application program executed at the foreground is changed, as shown in step S210.

If the current application program executed at the foreground is changed, e.g., is switched from a media player to a game program, the process from step S110 to step S170 is reset, so as to re-identify from step S110 the current application program executed at the foreground, as shown in step S220. The application program executed at the foreground refers to the application program which is switched by the user to be displayed in the uppermost layer of the screen in a plurality of application programs in execution.

Figure 7:
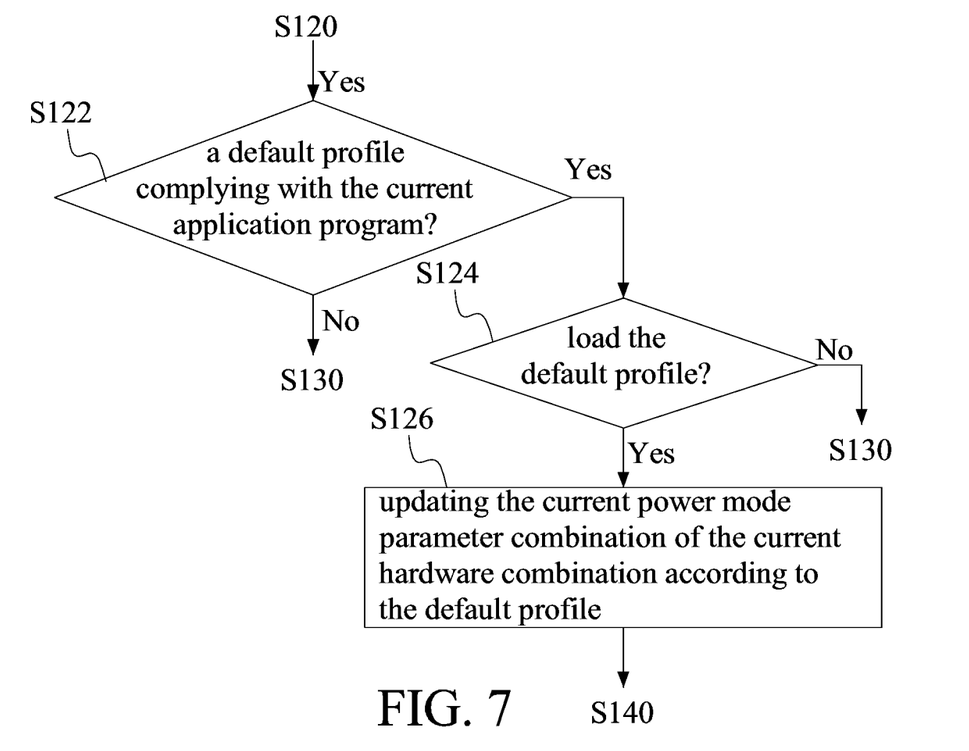
FIG. 7 is a detailed flowchart of a partial flow in FIG. 5.

As shown in FIG. 7, since after receiving the user-defined parameter combination in step S150 in FIG. 5, the client host 200 has generated the current profile as a default profile, or the client host 200 has stored the default profile originally, or the client host 200 has downloaded other available profiles and stored them as a default profile, at this time, other steps should be added between step S120 and step S130.

After the server 100 responds that there is an available profile in step S120, the client host 200 determines whether a default profile complying with the current application program is stored, as shown in step S122.

If there is a default profile, the client host 200 determines whether to load the default profile, as shown in step S124. If yes, the client host 200 loads the default profile as the current profile, and updates the current power mode parameter combination of the current hardware combination, as shown in step S124, step S126 and step S140. If the user-defined profile is not loaded, the available profile is downloaded through the network 300 according to step S130. The downloaded available profile is set as an updated current profile in step S140 and is stored in the storage unit 230 to become an updated default profile.

The ways of determining whether to load the user-defined profile include setting the power mode management mode to defaulting to using the default profile, asking the user whether to load the default profile, and so on. Step S120 to step S130 may also be completely interrupted, and it is set that the client host 200 only loads the default profile, but does not connect to the server 100 to request for the available profile. Or, in step S120, when the client host 200 determines that there is no available profile, step S124 of determining whether the default profile is loaded may also be executed. If in step S124 the client host 200 determines that the default profile is not loaded or that no default profile is available, step S150 is executed such that the client host 200 waits for receiving the user-defined parameter combination.

Figure 8:
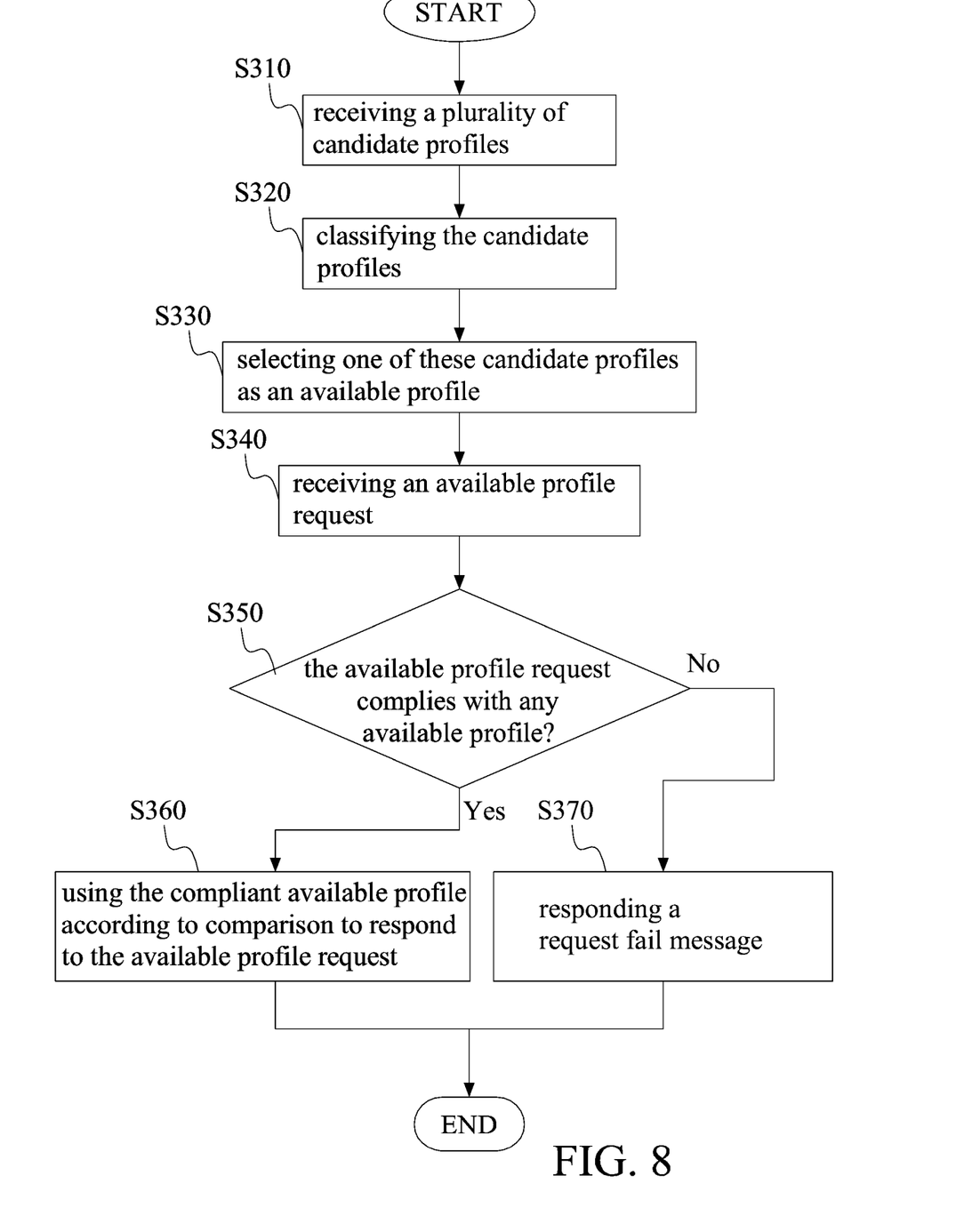
FIG. 8 is a flowchart of a method for providing a power mode parameter combination in one embodiment of this disclosure.

As shown in FIG. 8, in step S170, the client host 200 uploads the current profile to the server 100 as a candidate profile. At this moment, the server 100 executes a method for providing a power mode parameter combination.

As described above, the server 100 is actually linked with a plurality of client hosts 200. Therefore, the server 100 receives a plurality of candidate profiles from different client hosts 200 through network 300, as shown in step S310.

Each candidate profile mentioned above is correlated with a candidate application program and a candidate hardware combination, and stores a candidate parameter combination of the candidate hardware combination. The candidate hardware combination may at least include identification information of a candidate central processing unit and a candidate graphics processing unit. In one example, the candidate profile is a text file, and records the name and version number of the candidate application program, the detailed model of the candidate central processing unit and the detailed model of the candidate graphics processing unit. The candidate parameter combination is parameters set by each user for the central processing unit 210 and graphics processing unit 220 according to user experience when each client host 200 operates the application program. At this time, the central processing unit 210 and the graphics processing unit 220 respectively become the candidate central processing unit and the candidate graphics processing unit.

Next, the server 100 classifies the candidate profiles according to the candidate application program and the candidate hardware combination, as shown in step S320. That is, candidate profiles with the same candidate application program, candidate central processing unit and candidate graphics processing unit are classified into the same group of candidate profiles.

According to the classified candidate profiles, the server 100 selects one of these candidate profiles in each group as an available profile, as shown in step S330. The ways of selection are as mentioned above, and will not be repetitively described below.

At this time, for the available profile, the corresponding candidate application program, candidate hardware combination and candidate parameter combination are used as a target application program, a target hardware combination and a target parameter combination of the available profile.

The server 100 receives an available profile request from any client host 200 through the network 300, as shown in step S340. The available profile request is correlated with a current application program and a current hardware combination, i.e., the available profile request at least contains the detailed models of the central processing unit 210 and the graphics processing unit 220 of the client host 200, and the name and the version number of the application program in execution.

At this time, the server 100 compares whether the available profile request complies with any available profile, as shown in step S350.

When the current application program and the current hardware combination of the available profile request comply with the target application program and the target hardware combination of any available profile, the server 100 uses the compliant available profile according to comparison to respond to the available profile request, as shown in step S360. At this time, the client host 200 may receive the available profile and execute the steps after step S130 in FIG. 6. If there is no compliant available profile according to comparison, responding a request fail message, as shown in step S370.

Figure 9:
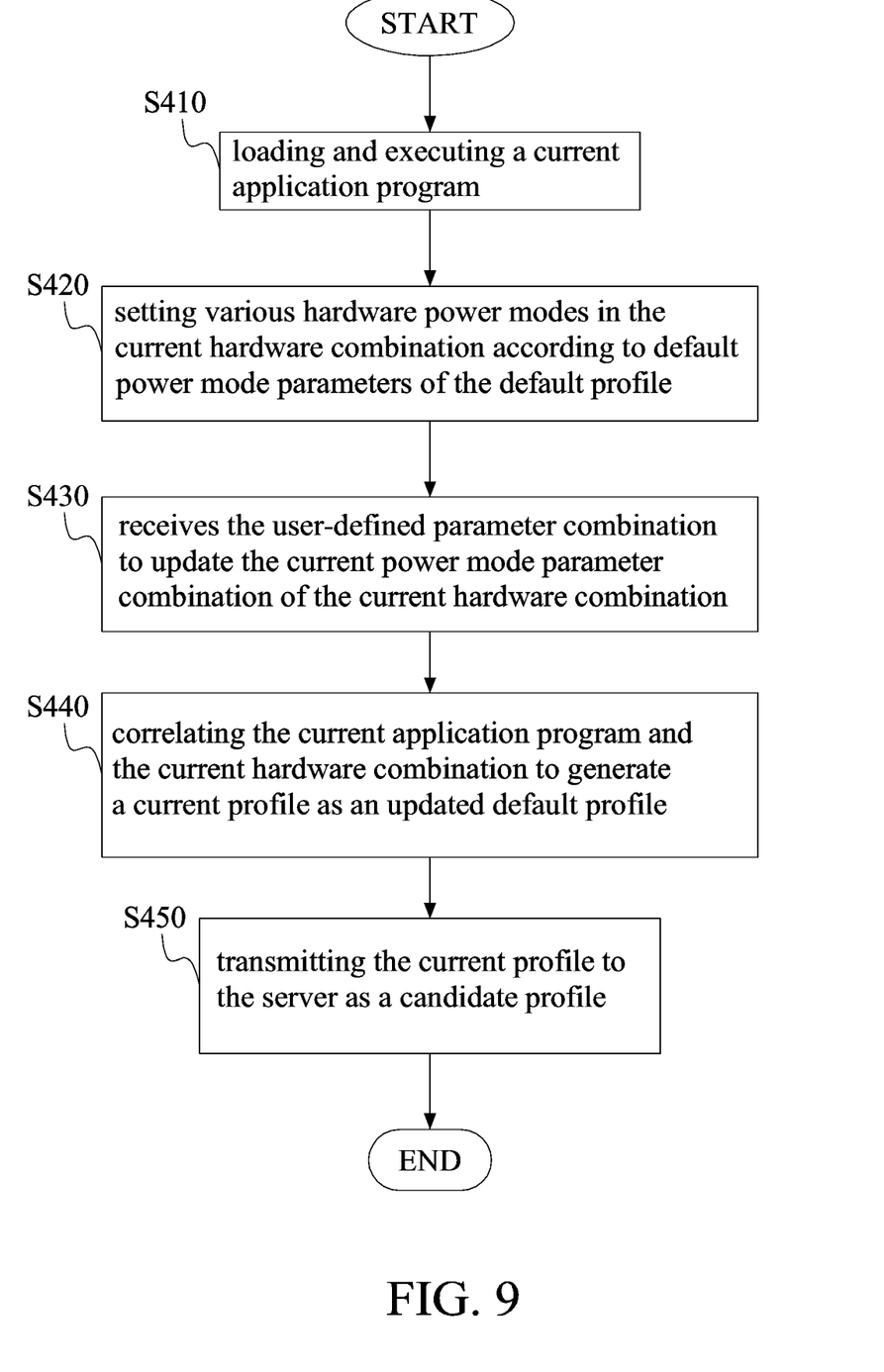
FIG. 9 is another flowchart of a method for updating a power mode parameter combination in one embodiment of this disclosure.

Referring to FIG. 9, a method for updating a power mode parameter combination executed by the client host 200 is to assist the server 100 in collecting candidate profiles. In one example, the power mode setting program segment is stored as a computer software in a storage medium for the client host 200 to load to execute the method for updating the power mode parameter combination.

After the client host 200 boots up, it executes identifying a current hardware combination of the client host 200, and loading and executing a current application program, as shown in step S410. Next, the client host 200 loads a default profile, and set various hardware power modes in the current hardware combination according to default power mode parameters of the default profile, as shown in step S420. The order of the step S410 and step S420 may be exchanged. For example, after the client host 200 boots up, firstly executes step S420, and then executes step S410 after the operation of the user.

The default profile mentioned above may be provided by the operating system or by bundled power mode management program installed by a manufacturer of the client host 200. The default profile may also be a combination of parameters that have been previously and manually adjusted by the user, or an available profile previously downloaded by the server 100.

Next, through the user's adjustment to the power mode settings, the client host 200 receives the user-defined parameter combination to update the current power mode parameter combination of the current hardware combination, as shown in step S430.

Next, the current application program and the current hardware combination are correlated, and the client host 200 generates a current profile as an updated default profile, as shown in step S440. The client host 20 transmits the current profile to the server 100 as a candidate profile, as shown in step S450.

According to the user's operation, the client host 200 may also execute the steps after step S110 in FIG. 5.

In the above-mentioned embodiment, different profiles, such as the candidate profile, the current profile, the default profile or the available profile, as described, are only correlated with the application program, the central processing unit 210 and the graphics processing unit 220. In fact, they may also be correlated with hardware that may change the power mode parameter combination in the client host 200, including but not limited to a heat dissipating device that may adjust heat dissipation efficiency (rotating speed of fans or coolant pumps is adjustable), an audio device (equalizer or sound field mode setting), keyboard backlight setting (to make specific keys eye-catching by emitting light).

The parameter or power mode parameter combination is not limited to the input of precise physical quantities, and may also be selected by the user between different levels or modes through pull-down menus or scroll bars.

For example, the power mode parameter combination of the central processing unit 210 or graphics processing unit 220 may be divided into three to five levels from down-clocking operation to overclocking operation, and the user may select one desired level. For example, the setting of the audio device may allow the user to select directly from different sound field modes without fine-tuning various values of the equalizer. The setting of keyboard backlight may also be selected by the user aiming at several specific operation modes, e.g., turning off backlight completely or only emitting dim light in a document mode, while providing backlight for specific keys (such as arrow keys) in a game mode.

Through the cooperation between the server 100 and the client host 200, the client host 200 may request the corresponding available profile from the server 100 at any time according to the different current application program. Therefore, in the client host 200, the power mode profile is not limited to the specific application program. The server 100 may also add or update the available profile through the uploading by the client host 200, so as to avoid the problem that a database cannot provide the available profile since no relevant profiles are established.

What is claimed is:

1. A power mode management system, comprising:
a server, connected to a network and storing at least one available profile, the at least one available profile being correlated with a target application program and a target hardware combination, and storing a target parameter combination of the target hardware combination; wherein the server receives a plurality of candidate profiles through the network, each of the candidate profiles is correlated with a candidate application program and a candidate hardware combination, and stores a candidate parameter combination;
classifying the candidate profiles into a plurality of groups according to the candidate application program and the candidate hardware combination;
in the candidate profiles of each group, selecting one of the candidate profiles as an available profile;
wherein among the candidate profiles, the server selects the candidate parameter combination of a most popular profile according to frequencies of uploading of the candidate parameter combinations and uses the corresponding candidate profile as a new available profile, and then uses the corresponding candidate application program, the corresponding candidate hardware combination, and the corresponding candidate parameter combination as the target application program, the target hardware combination, and the target parameter combination of the new available profile;
a client host, connected to the network, the client host including a current hardware combination, the client host loading and executing a current application program and loading a power mode setting program segment to execute the following steps:
when the current application program complies with the target application program and the current hardware combination complies with the target hardware combination, the client host loads the available profile from the server through the network, and updates a current power mode parameter combination of the current hardware combination according to the target parameter combination; and
when the current application program and the current hardware combination do not respectively comply with the target application program and the target hardware combination, the client host correlates the current application program, the current hardware combination and the current power mode parameter combination to generate a current profile, and transmits the current profile to the server as one of the candidate profiles.

2. The power mode management system according to claim 1, wherein the target hardware combination at least comprises a target central processing unit and a target graphics processing unit.

3. The power mode management system according to claim 2, wherein the current hardware combination at least comprises a central processing unit and a graphics processing unit.

4. The power mode management system according to claim 2, wherein the target hardware combination further comprises a heat dissipating device, an audio device or a keyboard.

5. The power mode management system according to claim 3, wherein the current hardware combination further comprises a heat dissipating device, an audio device or a keyboard.

6. The power mode management system according to claim 1, wherein after the client host executes the current application program, the client host generates an available profile request and transmits the available profile request to the server, and the available profile request contains the current application program and the current hardware combination.

7. The power mode management system according to claim 6, wherein when the current application program complies with the target application program and the current hardware combination complies with the target hardware combination, the server uses the corresponding available profile as a response to the available profile request.

8. The power mode management system according to claim 1, wherein the client host executes a plurality of application programs and uses the application program executed at a foreground as the current application program.

9. A method for providing a power mode parameter combination, comprising:
receiving a plurality of candidate profiles, wherein each candidate profile is correlated with a candidate application program and a candidate hardware combination, and storing a candidate parameter combination of the candidate hardware combination;
classifying the candidate profiles into a plurality of groups according to the candidate application program and the candidate hardware combination;
in the candidate profiles of each group, selecting one of the candidate profiles as an available profile among the candidate parameter combinations selecting the candidate parameter combination of a most popular profile according to frequencies of uploading of the candidate parameter combinations and using the corresponding candidate profile as an available profile, and using the corresponding candidate application program, the corresponding candidate hardware combination and the corresponding candidate parameter combination respectively as a target application program, a target hardware combination and a target parameter combination of the available profile;
receiving an available profile request, wherein the available profile request is correlated with a current application program and a current hardware combination; and
when the current application program and the current hardware combination respectively comply with the target application program and the target hardware combination, using the available profile to respond to the available profile request.

10. The method for providing a power mode parameter combination according to claim 9, wherein if there is no compliant available profile according to comparison, responding a request fail message.

* * * * *